United States Patent [19]
Gerber

[11] Patent Number: 5,985,421
[45] Date of Patent: *Nov. 16, 1999

[54] MULTILAYER FILM MATERIAL

[75] Inventor: Manfred Gerber, Singen, Germany

[73] Assignee: Alusuisse Technology & Management Ltd., Neuhausen am Rheinfall, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,177

[22] Filed: May 15, 1997

[30] Foreign Application Priority Data

Jun. 6, 1996 [EP] European Pat. Off. ............. 96810370

[51] Int. Cl.$^6$ .................................................. B32B 7/02
[52] U.S. Cl. ...................... 428/212; 428/34.3; 428/35.9; 428/36.9; 428/215; 428/222; 220/667
[58] Field of Search .................................. 428/35.9, 36.9, 428/34.3, 215, 212, 222; 220/667

[56] References Cited

U.S. PATENT DOCUMENTS 4,181,239  1/1980  Heiremans et al. ..................... 220/461
5,238,148  8/1993  Holoubek et al. ........................ 222/23

FOREIGN PATENT DOCUMENTS 0280066  8/1988  European Pat. Off. .
0473823  3/1992  European Pat. Off. .
0688666  12/1995  European Pat. Off. .
2383091  3/1978  France .

Primary Examiner—Deborah Jones
Assistant Examiner—Abraham Bahta
Attorney, Agent, or Firm—Fisher, Christen & Sabol

[57] ABSTRACT

Multilayer film material (22) for manufacturing a pipe-shaped body (21) of tube (17). The film material (22) contains at least one barrier layer (10). The film material (22) is of thickness (d) extending form the outside (14) of the pipe-shaped body (21) to the inside of the same. At least one barrier layer (10) is arranged within a distance (a) of the inside (15) of the pipe-shaped body (21). The distance (a) represents 5 to 40% of the total thickness (d) representing 100 percent. The film material used on a tube exhibits therefore a barrier layer which lies close to the inside of the tube and hence also close to the contents of the tube. Volatile constituents of the tube contents beings able to penetrate essentially only to the barrier layer and are not able to become concentrated in the other, thick layers of the wall.

8 Claims, 2 Drawing Sheets

MULTILAYER FILM MATERIAL

BACKGROUND OF THE INVENTION

1. Field of the Invention

The present invention relates to a multilayer film material for the pipe-shaped body of a tube, containing at least one barrier layer, where the film material is of thickness d extending from the outside of the pipe-shaped body to the inside of the same.

2. Background Art

Known are three-layer plastic films produced by the company SOLVAY under the trade name CLARENE® composite; the said composite is for the pipe-shaped body of tubes and comprises a laminate of LDPE/EVOH/LDPE. The EVOH is a middle layer with barrier properties. The properties of such a tube body is adequate for many applications involving volatile aroma-forming constituents.

As with all tube bodies made of plastic, the diffusion of aroma forming substances or constituents into the plastic layers can be a disadvantage.

BROAD DESCRIPTION OF THE INVENTION

The object of the present invention is to overcome this disadvantage and to provide for tubes pipe-shaped tube bodies which minimise the amount of aroma forming substances or constituents diffusing into the plastic.

That objective is achieved by way of the invention in that the multilayer film material 22 features at least one barrier layer 10 situated in a distance (a) of 5 to 40% of the total thickness d=100% from the inside 15 of the pipe-shaped tube body 21.

A useful version is such that the multilayer film material features at least one barrier layer 10 a distance (a) of 10 to 40%, preferably 10 to 30%, of the total thickness (d)=100% from the inside 15 of the pipe-shaped tube body 21.

The barrier layer 10 is of plastics or contains plastics and usefully the barrier layer 10 contains mainly polymers or copolymers of ethyl vinyl-alcohol, or the barrier layer 10 is of polymers or copolymers of ethyl vinyl-alcohol (also designated EVOH or EVAL).

In another advantageous form the multilayer film material according to the invention contains two barrier layers 10 which are situated within a distance (a) of 5 to 40% of the overall thickness (d)=100% from the inside 14 of the pipe-shaped tube body 21.

Apart from these barrier layers 10 according to the invention which are situated within a distance a, the film material may also exhibit a second or third etc. barrier layer, whereby such further barrier layers may lie outside the distance (a) and—with respect to the thickness (d)—may also lie in a region closer to the outside of the pipe-shaped tube body.

The barrier layer 10 may e.g. be a prelaminate (pre-manufactured laminate) such as a film laminate featuring an intermediate barrier layer with outer layers on both sides.

A film laminate containing e.g. two barrier layers may also be employed as prelaminate. The make-up of such a film laminate may e.g. contain in sequence: an outer layer, a barrier layer, an intermediate layer, a barrier layer and a further outer layer.

The thickness of the barrier layers may be e.g. 5 to 25 µm.

The thickness of the outer layers and any intermediate layers may be e.g. 10 to 150 µm, preferably 20 to 60 µm and in particular 50 µm.

The outer layers and any intermediate layers of the prelaminate may be made of thermoplastics, polyolefins being preferred. Especially suitable polyolefins are polyethylenes and polypropylenes. Examples of polyethylenes are low density polyethylenes (LDPE), linear low density polyethylenes (LLDPE), medium density polyethylenes (MDPE), linear medium density polyethylenes (LMDPE) and high density polyethylenes (HDPE). Especially suitable are the medium density polyethylenes (MDPE) and especially linear medium density polyethylenes (LMDPE).

The barrier layers, outer layers and any intermediate layers of the prelaminate may e.g. be joined together by means of bonding agents and/or laminating layers, or adhesives, or they may be joined together by extrusion coating.

The multilayer film material according to the present invention may be designed such that the barrier layer or barrier layers feature neighbouring layers of polyolefin material, preferably polyethylene or polypropylene layers.

The prelaminate may be processed into the multilayer film material according to the invention. For example, on one side of the prelaminate, one may provide an outer film of thickness 100 to 200 µm over a 30 to 90 µm, usefully 40–80 µm and preferably 60 µm thick laminating layer by means of a laminating material, in particular a laminating material containing polyethylene.

The outer film may be a monofilm or a film composite. The monofilm or composite making up the outer film may be of thermoplastics, polyolefins being preferred.

Preferred polyolefins are polyethylenes and polypropylenes. Examples of polyethylenes are low density polyethylenes (LDPE), linear low density polyethylenes (LLDPE), medium density polyethylenes (MDPE), linear medium density polyethylenes (LMDPE) and high density polyethylenes (HDPE). Especially preferred are the medium density polyethylenes (MDPE) and high density polyethylenes (HDPE).

Examples of outer film composites exhibit a make up of 33 µm medium density polyethylene (MDPE), 64 µm high density polyethylene (HDPE and 33 µm MDPE, or are made up of 25 µm MDPE, 50 µm HDPE and 25 µm MDPE.

Advantageously, at least the outer side of the outer film, i.e. the surface of the tube body facing outwards, can be sealed. This can be achieved by the outer surface of the outer film of the tube body exhibiting sealing properties or by depositing a coating for sealing on the outer surface.

The prelaminate and the outer films may be joined together by laminating or coextrusion. Particularly advantageous is to produce the said film materials by employing a prelaminate and outer films that are ready made and may e.g. be available in commercially obtainable form. By joining the pre-made material to the outer films the film material according to the invention can, to advantage, be made in one manufacturing step.

The prelaminate of such film material comprising outer films and prelaminate exhibits one free side. As a rule this free side of the prelaminate is used for sealing purposes when the film material is used later. If the free side of the laminate itself exhibits no or insufficient sealing properties, then a sealing layer such as a sealable film, may be deposited on the free side of the prelaminate. The attachment of the sealable film may be effected e.g. by lamination coating. The sealable film may exhibit a thickness of e.g. 15 to 70 µm and may contain or be of polyolefins such as polyethylenes.

The overall thickness of the film material according to the invention may be e.g. 250 to 450 µm, an overall thickness of 280 to 350 μm being preferred and an overall thickness of 300 to 200 μm being advantageous. In each case according to the actual thickness of the film material there is at least one barrier layer which, with respect to the free surface of the inner lying layer, i.e. the side facing the interior of the of a packaging tube body lie within a distance (a) of 5 to 40%, referred to the total thickness (d)=100%, of which distance (a) amounts to at least 12.5 to 22.5 μm and at most 100 to 180 μm, preferably at least 14 to 17.5 μm and at most 112 to 140 μm and advantageously at least 15 to 16 μm and at most 120 to 128 μm.

BRIEF DESCRIPTION OF THE DRAWINGS

FIG. 1 shows a composite layered structure according to the state of the art, FIGS. 2 to 4 show multilayer film material according to the present invention, and FIG. 5 shows a part of a tube 17 and the arrangement of a multilayer film material 22 as tube body 21.

DETAILED DESCRIPTION OF THE DRAWINGS

Figure 1:
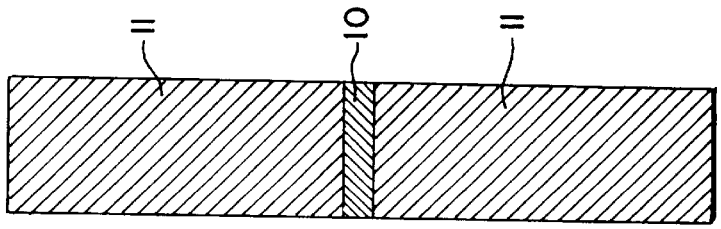

In FIG. 1 a barrier layer 10 of ethyl vinyl alcohol is coated with polyethylene films (LDPE) 11. The barrier layer is situated in the middle and is surrounded by relatively thick plastic layers. The volatile contents such as moisture, aromas, fragrant substances etc. can migrate or diffuse into the plastic layer at least up to the barrier layer. The manufacture of the laminate film foresees at least two lamination steps i.e. a first lamination step for cladding one side of the barrier layer and a second lamination step for cladding the other side of the barrier layer.

In FIGS. 2 to 5 the outward facing or outer side of the multilayer film material 22 is indicated by the number 14 and the inward facing or inner side of the multilayer film material 22 is indicated by the number 15. The total thickness is indicated by (d), and the distance of the barrier layer 10 from the inner side 15 of the tube body by (a).

Figure 2:
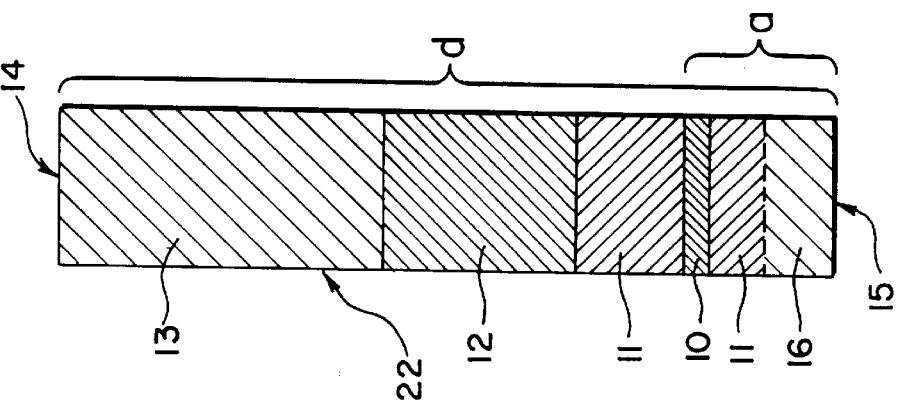

Among the highly preferred film materials 22 according to the present invention are e.g. those shown in FIG. 2:

a) sealable polyethylene layer 13 of thickness 80 to 180 μm b) lamination layer 12 of thickness 40 to 80 μm c) polyethylene layer 11 of thickness 50 to 70 μm d) ethyl vinyl alcohol layer 10 of thickness 5 to 25 μm e) polyethylene layer 11 of thickness 50 to 70 μm f) sealable polyethylene layer 16 of thickness 15 to 70 μm, where the layer a may represent the outer layer and therefore in a tube body the outward facing layer 14, layer f) the layer 15 facing the tube interior and the layers c), d) and e) together the separately produced prelaminate. In this prelaminate the layers c) and e) along with f) represent the outer layers and layer d) the barrier layer.

Figure 3:
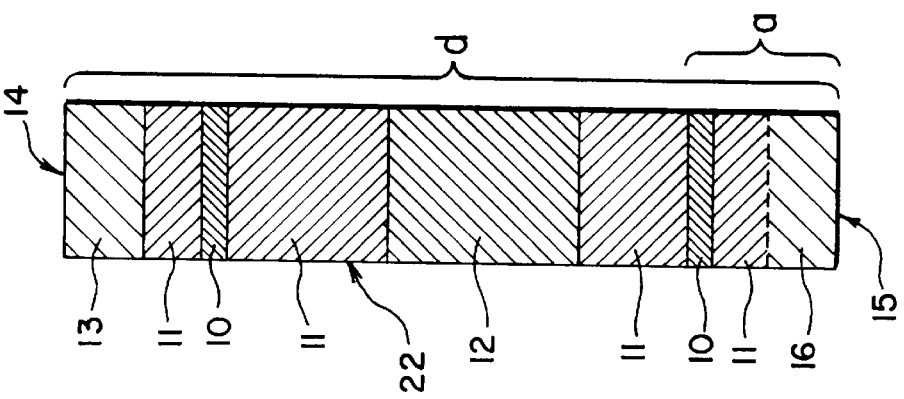

Further preferred film materials have the layer structure as in FIG. 3:

a) sealable polyethylene layer 13 of thickness 20 to 70 μm b) polyethylene layer 11 of thickness 50 to 80 μm c) ethyl vinyl alcohol film 10 of thickness 5 to 15 μm d) polyethylene layer 11 of thickness 20 to 80 μm e) lamination layer 12 of thickness 40 to 80 μm f) polyethylene layer 11 of thickness 50 to 70 μm g) ethyl vinyl alcohol film 10 of thickness 5 to 25 μm h) polyethylene layer 11 of thickness 50 to 70 μm i) sealable polyethylene layer 16 of thickness 30 to 100 μm, where in a tube body the layer a forms the outward facing side 14 and the layers a), b), c), and d) form the outer film and layer i) the side 15 facing the interior of the tube, and the layers f), g) and h) along with i) together may represent a separately manufactured prelaminate. In this prelaminate the layers f) and h) along with i) represent the outer layers and the layer g) the barrier layer. The outer film with layers a), b), c) and d) has therefore a make up which is not unlike that of the prelaminate. The outer film contains a further barrier layer i.e. in the present film material a second barrier layer.

A film material developed further with respect to the above film material may contain the following layer structure:

a) sealable polyethylene layer of thickness 20 to 100 μm b) polyethylene layer of thickness 20 to 100 μm c) ethyl vinyl alcohol film as barrier layer of thickness 5 to 25 μm d) polyethylene layer of thickness 20 to 80 μm e) lamination layer of thickness 40 to 80 μm f) polyethylene layer of thickness 20 to 80 μm g) ethyl vinyl alcohol film as barrier layer of thickness 5 to 25 μm h) polyethylene layer of thickness 50 to 80 μm i) sealable polyethylene layer of thickness 20 to 100 μm.

This film material advantageously exhibits a mirror image make up with lamination layer e) forming the middle layer. By folding a prelaminate material in the middle, therefore, and laminate bonding the faces that come together, one succeeds in obtaining a film material according to the invention. In such a case this represents a so called blocked foil material. Instead of the layers a) and b), or h) and i) one may employ a 20 to 180 μm thick sealable polyethylene layer.

Figure 4:
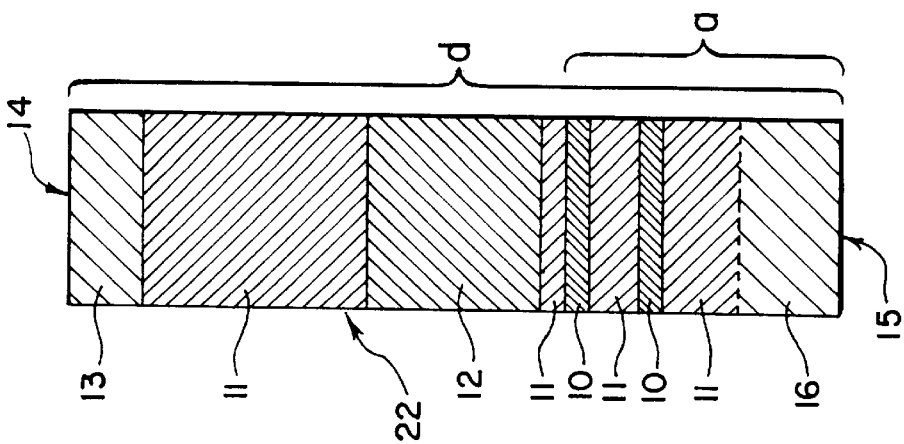
FIGS. 1 to 5 illustrate the present invention further by way of example.

A further preferred foil material may have the make up shown in FIG. 4:

a) sealable polyethylene layer 13 of thickness 20 to 70 μm b) polyethylene layer 11 of thickness 90 to 180 μm c) lamination layer 12 of thickness 40 to 80 μm d) polyethylene layer 11 of thickness 30 to 100 μm e) ethyl vinyl alcohol layer 10 as barrier layer of thickness 5 to 25 μm f) polyethylene layer 11 of thickness 30 to 80 μm g) ethyl vinyl alcohol film 10 of thickness 5 to 25 μm h) polyethylene layer 11 of thickness 30 to 45 μm i) sealable polyethylene layer 16 of thickness 30 to 100 μm.

where in the case of a tube body the layer a forms the outer facing side 14 and layer i) forms the side 15 facing the interior of the tube and the sides d), e), f), h) and i) together may represent a separately produced prelaminate. In this prelaminate the layers d) and h) along with i) represent the outer layers, layer f) the intermediate layer, and layer e) and g) the barrier layers.

In the case of the sealable polyethylene, inward facing side 15 of layer f according to FIG. 3, or layer i) according to FIG. 4, a propylene may be employed instead of polyethylene.

The sealable polyethylene or polypropylene, inward facing side 15 of layer f) according to FIG. 4, or layer i) according to FIG. 4, may be films.

In the above examples films may be employed for example as layers. A bonding agent may be employed between the individual layers, such as the films of the outer film and/or the outer films and the prelaminates and/or between the films of the prelaminate.

The individual films may be joined to each other or the outer film and the prelaminate may be joined by laminate bonding or coextrusion, or all films may be joined in one process step to form the described film materials. If the film material has a mirror image structure in which the lamination bonding agent forms the middle layer, then this may be achieved preferably by folding a prefabricated material in the middle and bonding together the two sides coming into contact with each other.

Figure 5:
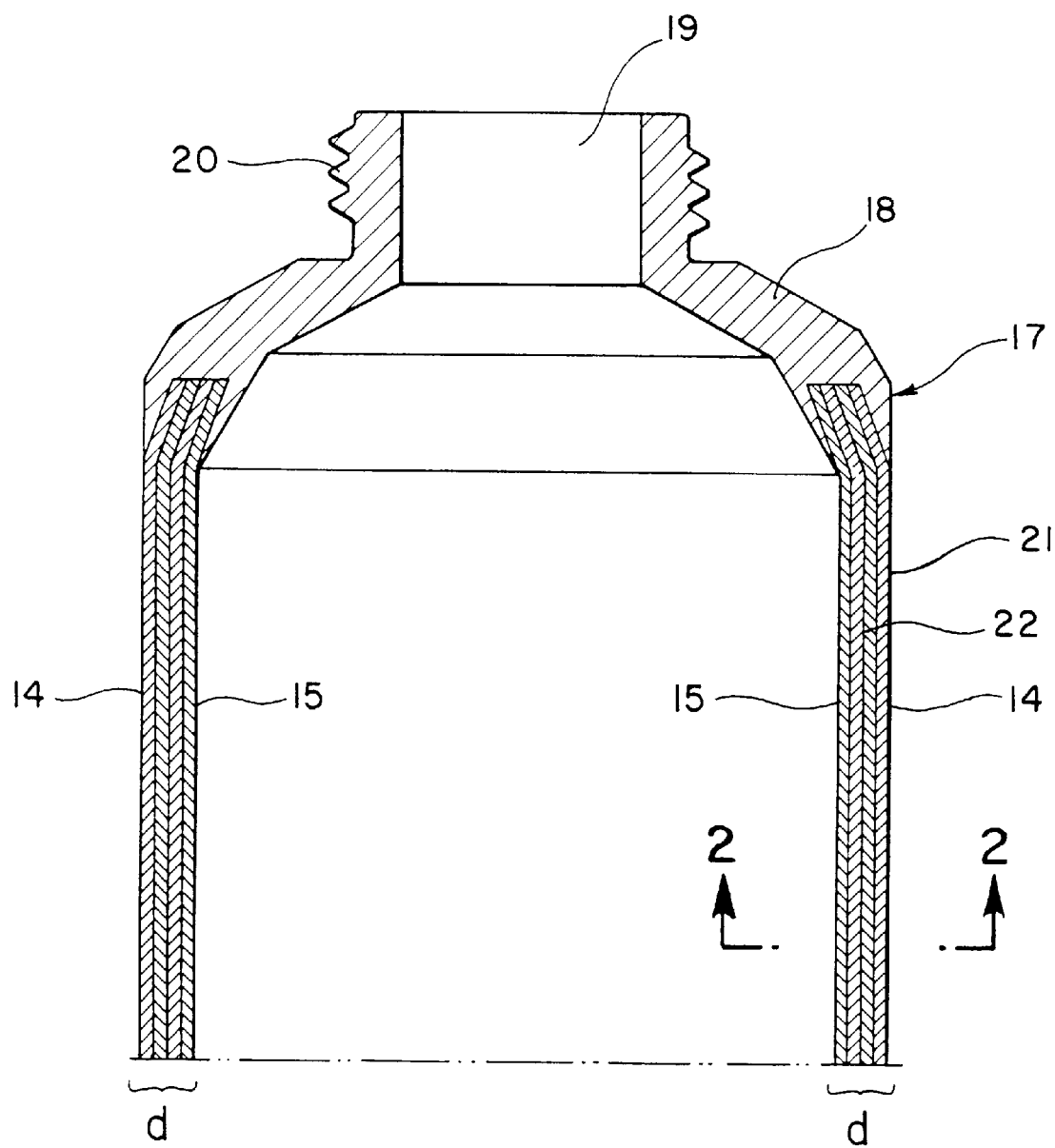

FIG. 5 shows a part of a tube 17 featuring a shoulder part 18 and an outlet opening 19 with a thread 20. The shoulder part 18 is attached permanently and sealed to the pipe-shaped tube body 21. The tube body 21 made of multilayer film material 22 has two surfaces, one of which is the outer facing side 14 of the tube and the other is the inner facing side 15. The multilayer film material 22 is of thickness (d). The layered structure along a line of section A—A is shown in FIGS. 2 to 4.

The multilayer film material according to the present invention may be employed for the bodies of tubes for packaging e.g. cosmetic or pharmaceutical products for body hygiene and care and for foodstuffs, victuals and semi-luxury items.

The film materials presented here and in particular tubes manufactured therefrom offer the advantage that volatile ingredients in the contents of the tubes, for example aromas and moisture may penetrate only thin layers of plastic before being stopped by the barrier layer. Film materials according to the present invention featuring more than one barrier layer offer further advantages. The moisture influences the action of the barrier layers. If for example the moisture diffusing through the film material is arrested in the first barrier layer and the moisture diminishes the blocking action e.g. with regard to gases, then the second barrier layer can have a complementary effect. Altogether therefore, a pronounced barrier action is achieved with respect to the contents of the tube, and the amount of constituent materials diffusing out of the tube contents is kept small. Further, the film material in question may be manufactured in a simple manner from prelaminate and outer film materials in one manufacturing step.

I claim:

1. A multilayer film material (22) for pipe-shaped tube body (21) of a tube 17, comprising (i) a thermoplastic lamination layer (12) having a thickness of 40 to 80 $\mu$m and having a first surface and a second surface, (ii) a first sealable polyethylene layer (13) having a thickness of 80 to 180 $\mu$m on the first surface of the lamination layer (12), outer side layer (14) of the multilayer film material (22) being uncoated surface of the first sealable polyethylene layer (13), (iii) a first polyethylene layer (11) having a thickness of 50 to 70 $\mu$m on the second surface of lamination (12), (iv) an ethyl vinyl alcohol layer (10) having thickness of 5 to 25 $\mu$m on the first polyethylene layer (11), (v) a second polyethylene layer (11) having a thickness of 50 to 70 $\mu$m on the ethyl vinyl alcohol layer (10), and (vi) a second sealable polyethylene layer (16) having a thickness of 15 to 70 $\mu$m on the second polyethylene layer (11), inner side (15) of the multilayer film material (22) being uncoated surface of the second sealable polyethylene layer (16), the multilayer film material (22) having an overall thickness (d) which extends from the outer side (14) of the multilayer film material (22) to the inner side (15) of the multilayer film material (22), distance (a) from the inner side (15) of the multilayer film material (22) to interface between the ethyl vinyl alcohol layer (10) and the first polyethylene layer (11) is 5 to 40 percent of the total thickness (d) of the multilayer film material (22).

2. A multilayer film material (22) for pipe-shaped tube body (21) of a tube 17, comprising (i) a thermoplastic lamination layer (12) having a thickness of 40 to 80 $\mu$m and having a first surface and a second surface, (ii) a first polyethylene layer (11) having a thickness of 20 to 80 $\mu$m on the first surface of the lamination layer (12), (iii) a first ethyl vinyl alcohol film (10) having a thickness of 5 to 15 $\mu$m on the first polyethylene layer (11), (iv) a second polyethylene layer (11) having a thickness of 50 to 80 $\mu$m on said first ethyl vinyl alcohol film (10), (v) a first sealable polyethylene layer (13) having a thickness of 20 to 70 $\mu$m on the second polyethylene layer (11), outer side (14) of the multilayer film material (22) being uncoated surface of the first sealable polyethylene (13), (vi) a third polyethylene layer (11) having a thickness of 50 to 70 $\mu$m on the second surface of lamination (12), (vii) a second ethyl vinyl alcohol layer (10) having a thickness of 5 to 25 $\mu$m on the third polyethylene layer (11), (viii) a fourth polyethylene layer (11) having a thickness of 50 to 70 $\mu$m on the second ethyl vinyl alcohol layer (10), and (ix) a second sealable polyethylene layer (16) having a thickness of 30 to 100 $\mu$m on the fourth polyethylene layer (11), inner side (15) of the multilayer film material (22) being uncoated surface of the second sealable polyethylene layer (16), the multilayer film material (22) having an overall thickness (d) which extends from the outer side (14) of the multilayer film material (22) to the inner side (15) of the multilayer film material (22), distance (a) from the inner side (15) of the multilayer film material (22) to interface between the ethyl vinyl alcohol layer (10) and the third polyethylene layer (11) is 5 to 40 percent of the total thickness (d) of the multilayer film material (22).

3. A multilayer film material for pipe-shaped tube body of a tube, comprising (i) a thermoplastic lamination layer having a thickness of 40 to 80 $\mu$m and having a first surface and a second surface, (ii) a first polyethylene layer having a thickness of 20 to 80 $\mu$m on the first surface of the lamination layer, (iii) a first ethyl vinyl alcohol film having a thickness of 5 to 25 $\mu$m on the first polyethylene layer, (iv) a second polyethylene layer having a thickness of 20 to 100 $\mu$m on said first ethyl vinyl alcohol film, (v) a first sealable polyethylene layer having a thickness of 20 to 100 $\mu$m on the second polyethylene layer, outer side of the multilayer film material being uncoated surface of the first sealable polyethylene, (vi) a third polyethylene layer having a thickness of 20 to 80 $\mu$m on the second surface of the lamination layer, (vii) a second ethyl vinyl alcohol layer having a thickness of 5 to 25 $\mu$m on the third polyethylene layer, (viii) a fourth polyethylene layer having a thickness 50 to 80 $\mu$m on the second ethyl vinyl alcohol layer, and (ix) a second sealable polyethylene layer having a thickness of 20 to 100 $\mu$m on the fourth polyethylene layer, inner side of the multilayer film material being uncoated surface of the second sealable polyethylene layer, the multilayer film material having an overall thickness (d) which extends from the outer side of the multilayer film material to the inner side of the multilayer film material, distance (a) from the inner side of the multilayer film material to interface between the ethyl vinyl alcohol layer and the first polyethylene layer is 5 to 40 percent of the total thickness (d) of the multilayer film material.

4. The multilayer film material according to claim 3 wherein the thermoplastic lamination layer is composed of a folded over thermoplastic prelaminate layer having a thickness of 20 to 40 μm which has been folded in its middle with its facing surfaces bonded together.

5. A multilayer film material for pipe-shaped tube body of a tube, comprising (i) a thermoplastic lamination layer having a thickness of 40 to 80 μm and having a first surface and a second surface, (ii) a first polyethylene layer having a thickness of 20 to 80 μm on the first surface of the lamination layer, (iii) a first ethyl vinyl alcohol film having a thickness of 5 to 25 μm on the first polyethylene layer, (iv) a first sealable polyethylene layer having a thickness of 20 to 180 μm on the first ethyl vinyl alcohol film, outer side of the multilayer film material being uncoated surface of the first sealable polyethylene, (v) a second polyethylene layer having a thickness of 20 to 80 μm on the second surface of the lamination layer, (vi) a second ethyl vinyl alcohol film having a thickness of 5 to 25 μm on the second polyethylene layer, and a (vii) second sealable polyethylene layer having a thickness of 20 to 180 μm on the second ethyl vinyl alcohol film, inner side of the multilayer film material being uncoated surface of the second sealable polyethylene layer, the multilayer film material having an overall thickness (d) which extends from the outer side of the multilayer film material to the inner side of the multilayer film material, distance (a) from the inner side of the multilayer film material to interface between the second ethyl vinyl alcohol film and the second polyethylene layer is 5 to 40 percent of the total thickness (d) of the multilayer film material.

6. The multilayer film material according to claim 5 wherein the thermoplastic layer is composed of a folded over thermoplastic prelaminate layer having a thickness 20 to 40 μm which has been folded in its middle with its facing surfaces bonded together.

7. A multilayer film material (22) for pipe-shaped tube body (21) of a tube 17, comprising (i) a thermoplastic lamination layer (12) having a thickness of 40 to 80 μm and having the first surface and a second surface, (ii) a first polyethylene layer (11) having a thickness of 90 to 180 μm on the first surface of the lamination layer (12), (iii) a first sealable polyethylene or polypropylene layer (13) having a thickness of 20 to 70 μm on the first polyethylene layer (11), outer side of the multilayer film material (22) being uncoated surface of the first sealable polyethylene or polypropylene layer (13), (iv) a second polyethylene layer (11) having a thickness of 30 to 100 μm on the second surface of the lamination layer (12), (v) a first ethyl vinyl alcohol layer (10) having a thickness of 5 to 25 μm on the second polyethylene layer (11), (vi) a third polyethylene or propylene layer (11) or a polyethylene or polypropyylene film (11) having a thickness of 30 to 80 μm or 5 to 25 μm, respectively, on the first ethyl vinyl alcohol layer 10, (vii) a second ethyl vinyl alcohol layer (10) having a thickness of 5 to 25 μm on the third polyethylene or polypropylene layer (11) or the polyethylene or polypropylene film (11), (viii) a fourth polyethylene layer (11) having a thickness of 30 to 45 μm on the second ethyl vinyl alcohol (10), and (ix) a second sealable polyethylene layer (16) having a thickness of 30 to 100 μm on the fourth polyethylene layer (11), inner side (15) of the multilayer film material (22) being uncoated surface of the second sealable polyethylene layer (16), the multilayer film material (22) having an overall thickness (d) which extends from the outer side (14) of the multilayer film material (22) to the inner side (15) of the multilayer film material (22), distance (a) from the inner side (15) of the multilayer film (22) to the interface between the ethyl vinyl alcohol layer (10) and the first polyethylene layer (11) is 5 to 40 percent of the total thickness (d) of the multilayer film material (22).

8. The multilayer film (22) according to claim 7 wherein (vi) is the third polyethylene layer (11).

* * * * *